United States Patent [19]

Breitmeier

[11] Patent Number: 5,097,119
[45] Date of Patent: Mar. 17, 1992

[54] DEVICE FOR PRECISELY MEASURING THE DISTANCE BETWEEN A TEST POINT ON A TEST SURFACE AND A REFERENCE PLANE

[76] Inventor: Ulrich O. Breitmeier, Nobelstr. 15, D-7000 Stuttgart 80, Fed. Rep. of Germany

[21] Appl. No.: 399,517
[22] PCT Filed: Jan. 3, 1989
[86] PCT No.: PCT/EP89/00001
§ 371 Date: Aug. 24, 1989
§ 102(e) Date: Aug. 24, 1989

[30] Foreign Application Priority Data

Jan. 9, 1988 [DE] Fed. Rep. of Germany ....... 3800427

[51] Int. Cl.⁵ .................... G01J 1/20; G01N 21/86
[52] U.S. Cl. .................... 250/201.4; 250/561; 356/376
[58] Field of Search .............. 250/560, 561, 201.1, 250/201.2, 201.4, 201.5, 571, 572; 356/371, 376, 1, 4, 394; 369/44.22, 44.25, 44.29, 44.32, 44.35, 44.36, 44.41

[56] References Cited

U.S. PATENT DOCUMENTS

| | | | |
|---|---|---|---|
| 4,611,317 | 9/1986 | Takeuchi et al. | 369/44.36 |
| 4,641,020 | 2/1987 | Iwai | 250/201.5 |
| 4,674,882 | 6/1987 | Dorman et al. | 356/373 |
| 4,703,468 | 10/1987 | Baba et al. | 369/44.36 |
| 4,737,920 | 4/1988 | Ozawa | 356/394 |
| 4,806,777 | 2/1989 | Ulbers et al. | 250/560 |
| 4,891,798 | 1/1990 | Shinkai | 250/201.5 |
| 4,899,327 | 2/1990 | Bates et al. | 250/201.5 |

FOREIGN PATENT DOCUMENTS 0071667 2/1983 European Pat. Off.
0206744 12/1986 European Pat. Off.

Primary Examiner—David C. Nelms
Assistant Examiner—Michael Messinger
Attorney, Agent, or Firm—Fred Philpitt

[57] ABSTRACT

A regulating circuit for the servo drive for the mobile precision optics of an equipment for high-precision measuring of micro-contours of a work-piece surface contains a position transmitter (40) which ascertains the actual position of the precision optics to correct disturbances caused by vibration and shaking. This is part of an internal loop comprising a proportional-derivative controller (68) and an integral controller (70). An external loop which predetermines the reference input for the internal loop formed by these elements contains an integral controller (74) which receives a signal from a detector (82) which corresponds to the spacing of the just measured point on the test surface from the focal point of the precision optics. The local reflection behaviour of the test surface is measured (84) and used for correcting the gradient of the control characteristics (86).

36 Claims, 11 Drawing Sheets

DEVICE FOR PRECISELY MEASURING THE DISTANCE BETWEEN A TEST POINT ON A TEST SURFACE AND A REFERENCE PLANE

The invention relates to an instrument for determining the focal distance of a test are from a reference area.

BACKGROUND

An instrument of this type is disclosed in DE-OS 35 36 700. This equipment enables surfaces of a test object to be measured to a high degree of accuracy on very small surface contours.

For many applications it would be desirable to be able to use a device of this kind under non-laboratory conditions, and even when the test piece and/or the equipment is subjected to vibrations or jolts.

THE INVENTION IN GENERAL

The present invention enables a device to be developed still further, so that even under the above-mentioned conditions of use it will be possible to measure even the smallest surface contours of a test piece.

The instrument of this invention is equipped with a regulating circuit which quickly controls errors in a test signal caused by vibrations and shocks. This correction is effected roughly speaking in that two nested control loops are used, whereby the outer control loop is provided with an integral action controller and there has a relatively large time constant, whereas the internal control loop is provided with a proportion-derivative controller and therefore has a small time constant. The outer control loop derives the control value for the inner control loop from the output signal of the opto-electrically working measured distance and from the actual position of the precision optics or the output signal of an acceleration sensor, and the inner control loop receives as the actual value the directly measured position of the precision optics. In the error signal, which supplies the inner control loop for driving the servo mechanism, are thus contained signal portions which are susceptible to vibrations and jolts and have such a phase length that an additional force is applied on the servo drive, which actively compensates the reaction of the precision optics to the vibrations and jolts.

The design of the apparatus in accordance with the invention also eliminates disturbances which are brought on by electrical irradiations.

With my instrument the control of vibrations and jolts is effected by having a reference optics exactly identical to the measuring optics, which is also linked up with a signal channel identical to the signal channel of the measuring optics. Whereas however the measuring optics is directed on the test area having micro unevenesses, the reference optics works with an ideal flat reference area which is fixed vis-a-vis the instrument housing. Thus the output signals of the signal channel associated with the reference optics are directly a measure for vibration and shock induced signal portions in the signal channel associated with the measuring optics. Thus if the outputs of the two signal channels are collated by differentially a vibration and shock-compensated measuring signal is obtained. The design of the actual measuring instrument and the reference device is exactly the same optically, mechanically and electrically, down to the difference between the test area and the reference area, a broad-band balancing of the vibrations and shocks is thus obtained, because both the systems react in exactly the same way to these external disturbances. The development of my invention ensures that the acceleration sensor used to determine the vibrations and shocks reacts to the latter exactly the same as the measuring optics.

The development of my invention ensures that the measuring optics and the mass-body optics and also the electro-magnetic unit associated with them may have exactly the same design. Only the external circuitry of these electro-magnetic units are different: In the measuring optics the coil serves as a driving coil, and in the mass-body optics as an induction coil.

The working speed of an instrument for accurate determination of the distance of a test point lying on a test area from a reference area is a function of the gradient of the characteristic curve of the detector. Obviously the detector generates an output signal for a given distance of the test point from the reference area which is proportional to the intensity of the measuring light incident upon it. This intensity will depend on how great is the reflectivity of the test area on the test point and what is the gradient of the test area at the test point. Both the reflectivity and the slope of the test area can change over the test area, e.g. on account of the surface contour which is to be measured and the different materials used in the test piece, which essentially have a varying degree of reflection. The development of my invention ensures that the instrument works independent of such alterations in reflectivity and/or slope of the test area (referred to in the following as "reflection behaviour") at the test point with identical gradient of the detector curve and thus the same sensitivity of positional control of the measuring optics. Thus a constant measuring error is obtained throughout the test area; it will also be possible to scan the test area by moving the test piece or the measuring optics and the scanning head containing the detector at a specified uniform rate.

With my instrument one can obtain a measuring signal corresponding with the local reflectivity and the local slope of the test area, by adding the two output signals of the transducer elements where there is a transducer in the detector device having two transducer elements. The normal measuring signal corresponding to the distance between the test point and the reference area is generated by subtractively collating these output signals. This is achieved by only a simple summation amplifier and no other expensive and bulky transducer elements are required.

With my instrument only a single circuit is needed to effect the correction to the distance signal inversely proportional to the intensity of the light incident o the detector.

The development of my invention ensures that the correction circuit is able to effect other intensity-specific corrections on the distancer signal, which, for example, may be essentially based on a given non-linearity of the transducer arrangement used in the detector.

With my instrument as claimed in claim 9 it is possible to file various records in the correction memory of correction factors depending on the measuring light intensity, in order to take into account difference transducer types, basic differences in geometry of the beam path and varying disturbance influences. The characteristic that is required is then set on the selector unit.

In my instrument the control of different reflection conditions in the test point may be switched off at will, for example so as to determine the various reflection conditions across the test area. Such a disconnection can also be useful if the measuring optics has been deflected far from its normal range of adjustment, which can happen where no test area is in front of it.

Another embodiment of my invention has a coarse display for very rough mismatching of the measuring optics position. Such a coarse matching facilitates the coarse setting of the measuring optics focal plane onto the test area to be effected manually or by an additional servo system.

Another embodiment of my invention is advantageous as regards the suppression of ambient light, the suppression of electrical irradiations with mains frequency and in regard to the small consumption of power of the equipment and keeping small the evolution of heat in the laser used as the light source.

Another embodiment of my invention ensures that the distance between the test point and the reference area is displayed faster, because the position reference input delivered by the external integral controller for the measuring optics is used to drive the appropriate display unit.

Another embodiment of my invention ensures that there remains a larger distance between the reference area and the test area, even though the measuring optics and the reference optics have the same focal width. This eliminates the danger of a mechanical contact between the test area and the measuring head containing the two optical systems.

My invention ensures that vibrations and shocks influencing the test piece or the measuring head are balanced out.

With my invention it is also possible to balance out vibrations and shocks which influence in different ways the test piece and the measuring head of the equipment.

In another embodiment of my invention very intensely contoured surface patterns are obtained, because in practice changes in the local reflection behaviour and micro unevenesses of the surface are often attributable to one and the same cause, e.g. grains of different composition or crystalisation direction in test pieces made from alloys. By way of the collation of the output signal characteristic for the local reflectivity of a summation amplifier associated with the transducer elements, with the output signal of a difference amplifier associated with the transducer elements, a finger print of the test area is obtained, such as cannot be derived with such clarity from any other signal.

My invention insures that asymmetries of the transducer elements, which can be caused by ageing, thermal effect or the like, are automatically eliminated.

Another specific embodiment of my invention involves a very sensitive proximity switch, which will respond if the distance between the measuring optics and a moved test piece within a very close tolerance limit reached a specific value established in practice.

My instrument has the advantage that the accuracy of the distance measurement is maintained even if there are changes affecting any particular component of the scanning head induced by heavy thermal fluctuations.

My invention insures that a thermal compensation of this kind can be quickly effected in large temperature ranges.

For many applications it is advantageous if the zone illuminated on the test area is not punctiform but rather has a larger diameter, that is, it is a spot. It is then possible to measure the absolute position or the surface properties averaged across this small surface zone. With the development of the invention according to a specific embodiment it is possible to measure a test area at will point-wise or averaged over small test spots.

My invention makes possible a simple continuous setting of the diameter of the test spots when the equipment is ready for use.

Coordinate inspection machines contain hitherto primarily mechanical scanners, and to calibrate such machines on site a ball is scanned by the scanner, the absolute position of which in space is known. In this way the information on the starting position of the scanning head is obtained. The device in accordance with the invention has an optical scanning head, and with such a head it would not be possible to directly scan a reference sphere, because the measuring light beam would be reflected back in the same direction if impinging vertically on the reference ball, which is only the case if the scanning head has an exact radial alignment. The development of the invention in accordance with another embodiment ensures that the calibration of a coordinate inspection machine, which is designed using an instrument according to the invention, can be carried out in a similar fashion, as is usual with coordinate inspection machines having tactile keys.

My invention insures that the calibration of the starting position of the scanning head can be effected independent of a visual check by an operator. The drives of the coordinate inspection machine must move the scanning head only into a position in which there is a frictional contact with the test sphere. However, an exact relative position vis-a-vis the test sphere need not be moved into, because the starting signal of the scanning head is also used in the calibration.

The development of my invention makes it possible to measure even the internal faces of hollow, especially rotation-symmetric test bodies, such as cylinders or the like.

THE DRAWINGS

FIG. 1: A schematic vertical section through an optical scanning head for high-resolution measuring of a work piece surface together with an associated electronics unit and a part of a work piece to be measured;

FIG. 2: A circuit diagram of an input circuit of the electronic unit shown in FIG. 1;

FIG. 3: A block diagram of a control loop for following up the measuring optics of the scanning head shown in FIG. 1;

FIG. 4: Details of a part of the control loop shown in FIG. 3;

FIG. 5: A schematic representation of the optical and electronic basic elements of modified equipment for highly accurate measuring of a work piece surface;

FIG. 6: A schematic representation of a device for coarse adjustment of the measuring optics of the scanning head shown in FIG. 1;

FIG. 7: A circuit diagram similar to that in FIG. 3, showing a modified control loop;

FIG. 8: A modified device for maintaining the control characteristic despite the changes in the local reflection conditions for the control loops shown in FIGS. 3 and 7;

FIG. 9: A vertical section through a reference optics of a scanning head and a schematic representation of electronic units for linking the output signals of measuring optics and reference optics;

FIG. 10: A vertical section through a high-resolution optical proximity switch, which works on a principle which is similar to the scanning heads shown in FIGS. 1 and 9;

FIG. 11: An elementary connection diagram of a device for compensating asymmetries caused by thermal effect and other disturbances in the transducer arrangement of a scanning head pursuant to FIGS. 1, 9 or 10;

FIG. 12: A schematic representation of the beam path and of the lens readjustment for a modified scanning head, which is also suitable for a spot-wise measuring of a test area, so that if point measuring is set the beam path is displayed in balance condition of the control regulator;

FIG. 13: A schematic representation similar to that in FIG. 12, in which however the conditions with balanced control regulator and setting for spot-wise measuring of the test area are displayed;

FIG. 14: A representation similar to the one in FIG. 13, in which however the detuning of the detector for the spot-wise measuring of the test area is effected by electronic means;

FIG. 15: An axial section through the front end of a scanning head with attached calibrating scanning sphere; and FIG. 16: An axial section through the front end of a scanning head comprising an attachment for measuring the inside face of a cylindrical test piece.

DESCRIPTION OF THE PREFERRED EMBODIMENTS

Figure 1:
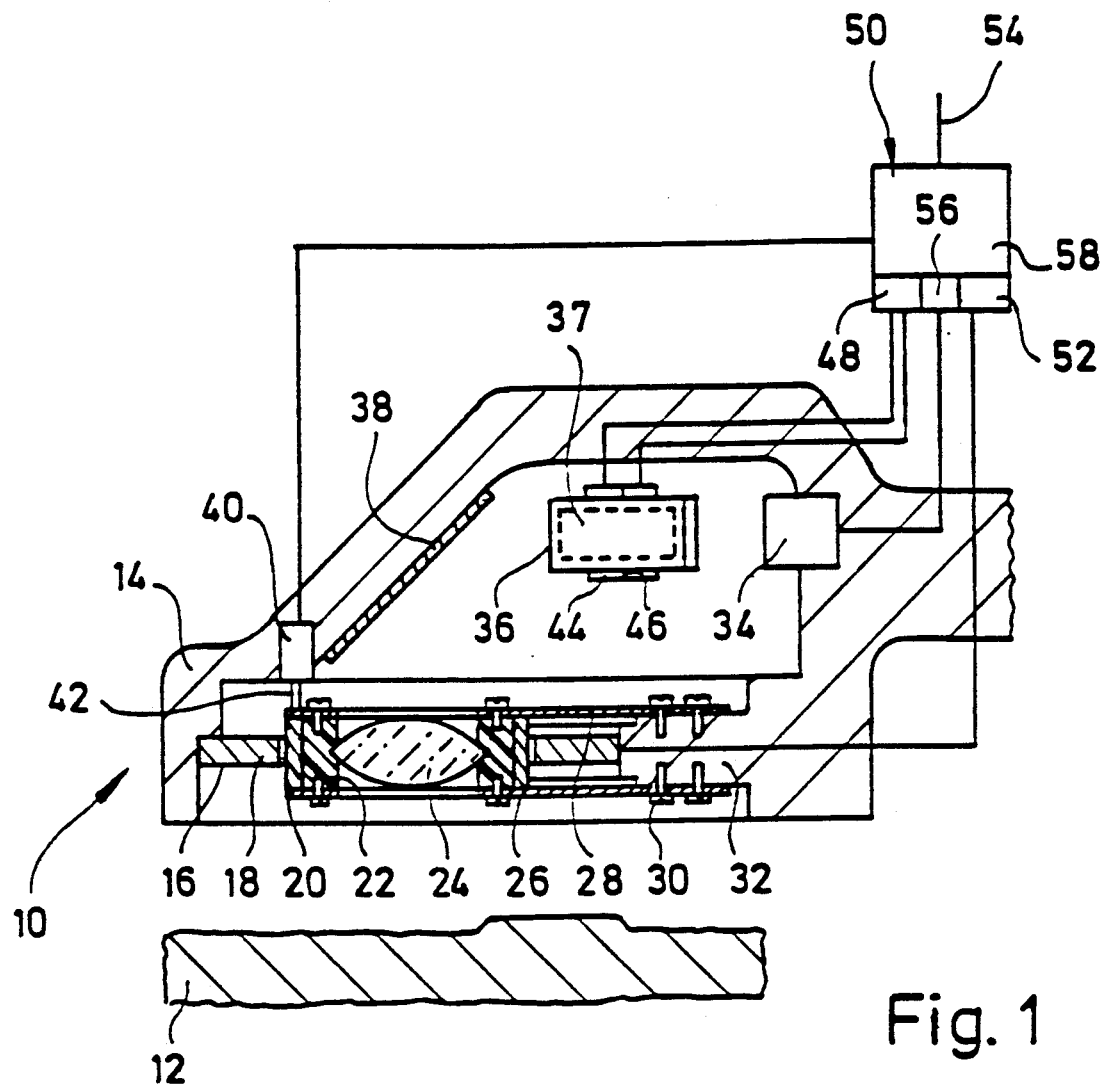

In FIG. 1, a scanning head is designated by 10, which serves for the highly-accurate measuring of surface roughnesses and textures on the surface of a work piece 12.

The scanning head 10 has a housing 14, which is essentially beaker-shaped. A toroidal coil 18 is inserted into the bottom hole 16 in the housing 14, which generates an axial magnetic field. The toroidal coil 18 works with an annular permanent magnet 20, which is stuck on the outside of a lens ring 22. The lens ring 22 holds a lens 24. The unit formed by the permanent magnet 20, the lens ring 22 and the lens 24 passes with radial play through the toroidal coil 18 and is carried by two parallel leaf springs 26, 28. The design of their section shown on the left in FIG. 1 is like spectacles, so that the lens 24 remains free, whereas the section on the right is lamellar, its extremity fixed by bolts 30 on a land 32 on the housing 14. The leaf springs 26, 28 thus form an elastic parallelogram suspension for the lens 24.

A semiconductor laser 34 working in red is fixed in the section shown on the right in FIG. 1 of the peripheral wall of the housing 14. The laser beam emitted from this passes through a semi-permeable measuring mirror 36 and arrives on a deflecting mirror 38. The light beam then transverses the lens 24 and is imaged by the latter on the surface of the work piece 12.

The laser light reflected by the work piece surface is collected by the lens 24 and arrives back at the measuring mirror 36 via the deflecting mirror 38. The latter splits part of the reflected measuring light and directs it through a prism 37 onto a photo-electric transducer arrangement 44, the center of which is designated at 46. The photo-electric transducer arrangement 44 has two transducer elements 44a and 44b arranged symmetrically to the center line 46 and generates an output signal, which is a function of the position of the incident light spot relative to the center line 46. This output signal reaches an input circuit 48 of an electronic unit associated with the scanning head 10 and designated by 50.

The electronic unit 50 contains circuits to be described more exactly later on, which contain the deviation of the instantaneously received output signal of the transducer arrangement 44 from that signal which is obtained when the measuring light impinges on the center line 46. The electronic unit 50 generates internally an error signal for a power amplifier 52 according to the difference of both these signals, which feeds the toroidal coil 18. The supply current for the toroidal coil 18 is increased or decreased until the measuring light spot again lies on the center line 46 on the transducer arrangement 44. This will be the case if the distance between the lens 24 and the illuminated place on the surface of the work piece 12 corresponds exactly to the focal length of the lens.

From the description given so far it will be evident that when the scanning head 10 moves over the surface of the work piece 12 the lens 24 moves axially in conformity with the surface profile of the work piece 12. A corresponding electrical signal is delivered by the electronic unit 50 for use in an external computer or some other signal-processing device on a line 54.

FIG. 1 also shows schematically another power amplifier 56 of the electronic unit 50, which supplies the laser 34.

An instrument for high-resolution measurement of a work piece surface, such as is formed by the above-described scanning head 10 and the associated electronic unit 50, is sensitive to mechanical disturbances, in particular vibrations and shocks, which act upon the scanning head 10 and/or the work piece 12. To eliminate a falsification of the surface measurement brought on by such mechanical disturbances, a regulating circuit of the electronic unit 50 designated by 58 in FIG. 1 has a special design, which will be described in detail further on in reference to FIGS. 2 to 4. Besides the output signal of the input circuit 48 the control loop 58 receives the output signal of a position indicator 40, which determines directly the actual position of the lens 24, e.g. in the form of a moving-coil system, which works together with a pick-up rod 42 moving with the lens 24.

Figure 2:
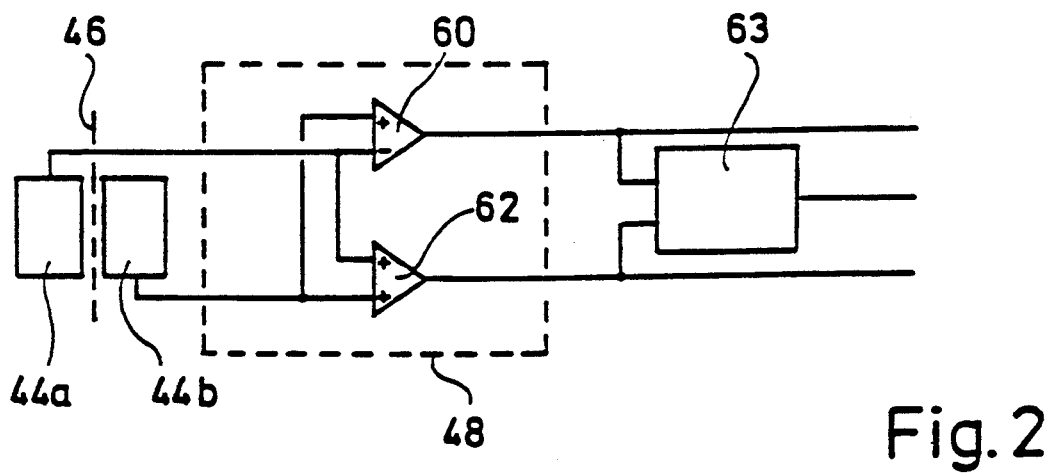

As can be seen in FIG. 2 the input circuit 48 contains a difference amplifier 60 and also a summation amplifier 62. Both amplifiers are actuated by the output signals of the two transducer elements 44a and 44b lying on both sides of the center line 46 of the transducer arrangement 44. The output signal of the difference amplifier 60 is associated with the distance between the just measured point on the surface of the work piece 12 and the focal point of the lens 24, while the output signal of the summation amplifier 62 is a measure for the reflectivity and the slope of the work piece surface in the just measured point.

The output signals of the difference amplifier 60 and of the summation amplifier 62 may be collated by a linking circuit 63, e.g. in multiplicative form. Its output signal gives a very contour-sharp image of the work piece surface, because local reflection behaviour and surface contour are often attributable to the same physical causes and the electrical signals corresponding to these magnitudes are collated by the switching circuit 63 to form a signal that is doubly dependent on the same causes and therefore very conspicuously variable.

If desired only the output signal of the summation amplifier 62 may be used and an image of the work piece surface derived from the local reflection behaviour recorded.

Figure 3:
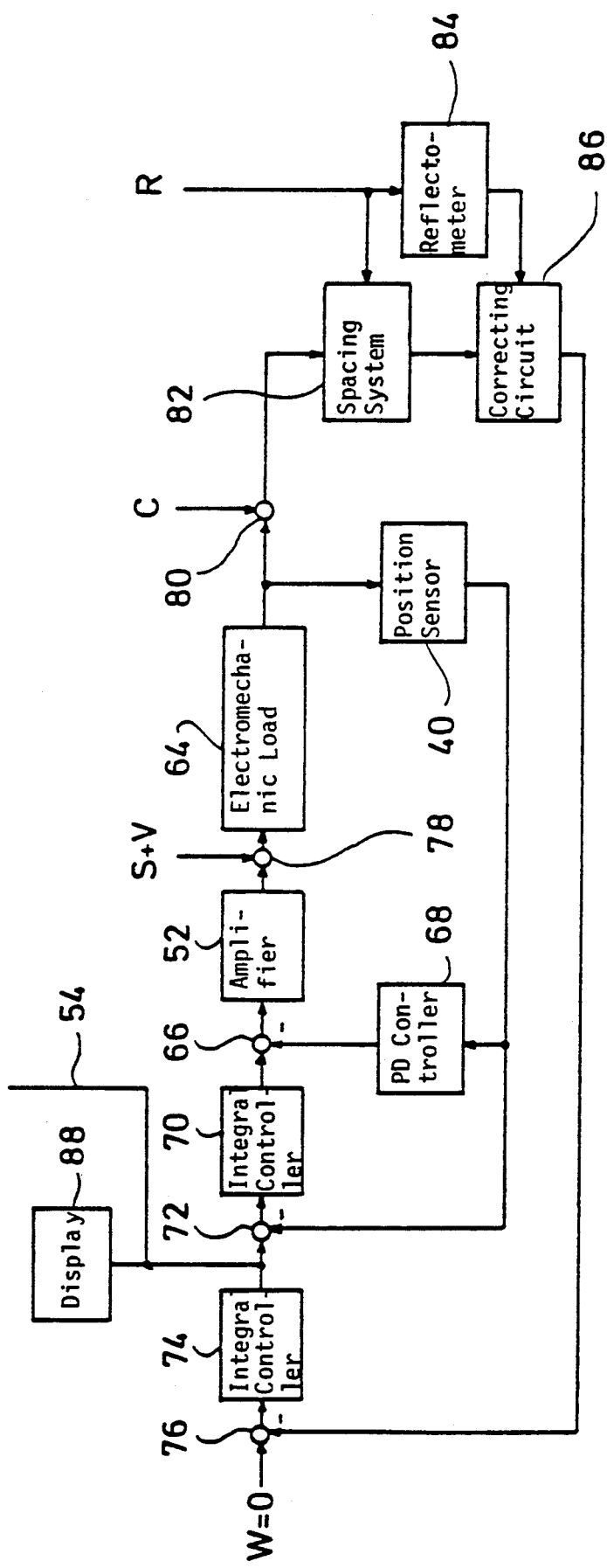

FIG. 3 shows details of the regulating circuit 58, by means of which the distance between the just measured point of the work piece surface and the lens 24 is always set on the focal length of the lens 24.

The oscillatory system formed by the lens 24, the leaf springs 26, 28 and the permanent magnet 20 is displayed by a box 64. The controllable power amplifier 52 is designed as a current regulator in regard to a possible quick approach of its output signal to the control signal delivered at its input. The control signal for the controllable power amplifier 52 is supplied by a subtracting circuit 66, which receives via a PD controller 68 the output signal of the position indicator 40 measuring the actual position of the lens 24. The second input of the subtracting circuit 66 receives the output signal of an integral action controller 70. The latter is actuated by the output signal of a subtracting circuit 72, the negative input of which is activated by the output signal of an external integral controller 74.

The external integral controller 74 is connected to the output of an external subtracting circuit 76. Its negative input is loaded by a signal derived from the output signal of the transducer arrangement 44, its positive input by a lens required position signal W=0.

Inserted in the control circuit are shown two summing elements 78, 80, which do not represent any part of the electronic unit 50, rather they illustrate the coupling of external influences.

The summing element 78 is located between the power element 52 designed as a current controller and the electro-mechanical load 64 from the components 18 to 28, by means of which are coupled jolts and vibrations, as indicated schematically with the letters "S+V".

The second summing element 80 lies in the route between the electro-mechanical load 64 and the transducer arrangement 44 and represents the coupling of the micro contour of the work piece surface, as indicated by the letter "C".

A third magnitude which influences the measurement is the capacity of the work piece surface to be tested in punctiform to reflect the incident light back to the lens 24. This capacity is a function firstly of the basic reflection properties of the material from which the work piece 12 is made, and secondly of the local slope of the work piece surface in the test point, as already explained. These influences are indicated in the drawing by the letter "R".

As already explained above, if the just measured point on the work piece surface lies in the focal point of the lens 24, the light spot generated by the lens 24 on the transducer arrangement 44 falls directly onto the center line 46. The two transducer elements 44a and 44b thus generate the same output signal, and at the output of the difference amplifier is received a signal of zero magnitude. The output signal of the difference amplifier 60 remains zero under these focal point conditions irrespective of how large the absolute intensity of the light incident on the transducer arrangement 44. The output signal of the summation amplifier 62 is on the other hand directly proportional to this intensity.

The increase of the output signal of the difference amplifier 60 as the outer focal point of the just measured point of the work piece surface increases is now a direct function of the total intensity of the light incident on the transducer arrangement 44 and hence also of the slope of the control characteristic and the maximum achievable control speed. This disturbance influence is shown schematically in FIG. 3, in that the disturbance variable "R" also acts on a box 82 containing the transducer arrangement 44.

This box is referred to in the following simply as the distance meter 86. It contains functionally the laser 34, the lens 24, the transducer arrangement 44, and the difference amplifier 60. In a suitable way the laser 34, the lens 24, the transducer arrangement 44 and the summation amplifier 62 are composed into a reflectometer 84.

To eliminate the fluctuation of slope of the control characteristic caused by the local properties of the test area there is provided a correction circuit 86 which is activated by the reflectometer 84 with a control signal associated with the instantaneously incident total light quantity, which roughly speaking alters the output signal of the distance meter 82 into a distance signal such as would be received from an absolutely flat standard test area under identical focussing conditions.

The distance signal delivered by the correction circuit 86 and corrected as regards the reflection conditions reaches the external integral action controller 74. This is a measure for the instantaneous focal point distance of the test point.

The integrated distance signal received from this at the output of the integral controller 74 is the total input reference for the position of the lens 24. This control value, which after removal of any remaining focussing error corresponds to the actual value of the lens position and thus the distance of the test point from the normal focussing plane of the lens 24, is displayed by a display unit 88 connected to the output of the integral controller 74 and at the same time supplied on the output line 54 connected to the integral controller 74.

It can be seen that the control circuit depicted in FIG. 3 comprises two nested control loops: One external control loop, which comprises the optical distance meter 82, the reflectometer 84, the correction circuit 86 and the external integral controller 74, and also the internal control loop. To the latter belong the power amplifier 52 designed as a current controller, the electro-mechanical load 64, the lens position indicator 40, the PD controller 68 and the internal integral controller 70, and also the two subtract circuits 66 and 72. The internal control circuit is designed for a limit frequency of typically 140 Hz and serves to control vibrations and shocks, in particular building oscillations. The external control loop is comparatively slow. A fixed measuring signal is obtained considerably faster than by just tapping the actual position of the lens 24, in that the active correction of vibration and oscillation-caused deflections of the lens 24 are transmitted to the inner control loop, designing the outer control loop as a preset reference input for the inner control loop and tapping the measuring signal at the output of the outer integral controller 74.

Figure 4:
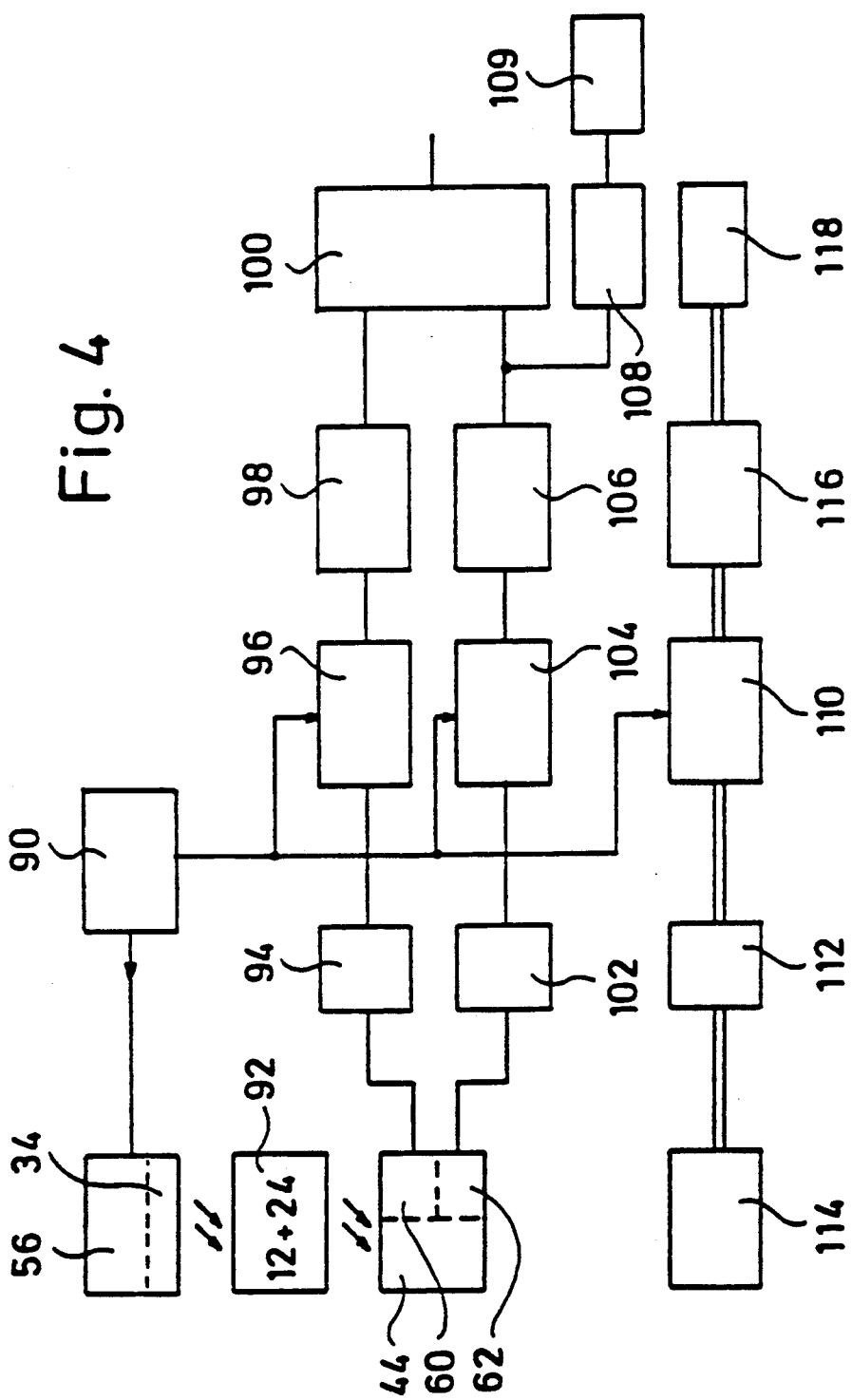

FIG. 4 shows details of the optical distance meter 82, the reflectometer 84 and the correction circuit 86 controlled by the latter.

A common clock generator 90 drives the power amplifier 56, which drives the semiconductor laser 34. The optical measuring distance between the laser 34 and the transducer arrangement 44 is signified by the box 92.

The distance signal delivered by the difference amplifier passes via a high-pass to a phase-sensitive rectifier 96, which is likewise controlled by the clock generator 90. The rectified distance signal then passes via a low-pass 98 to the dividend terminal of a similarly working division circuit 100.

The output signal of the summation amplifier 62 then passes via a high-pass 102, a phase-sensitive rectifier 104 and a low-pass 106 to the divisor terminal of the division circuit 100. Thus a distance signal is received at the output of the division circuit 100, which is multiplied by the reciprocal of the total light intensity incident on the transducer arrangement. This effectively performs the above-mentioned correction of the optically determined distance signal.

The output signal of the low-pass 106 is inverted by an inversion circuit 108, so that at the output of which a signal associated with the light loss in the test point is obtained. This is delivered to a display unit.

The clock generator 90 also drives another phase-sensitive rectifier arrangement 110, to which is delivered via a high-pass arrangement 112 the output signal of an auxiliary transducer arrangement 114. The output signals of the rectifier arrangement 110 are then delivered via a low-pass arrangement 116 to a display unit 118.

Figure 6:
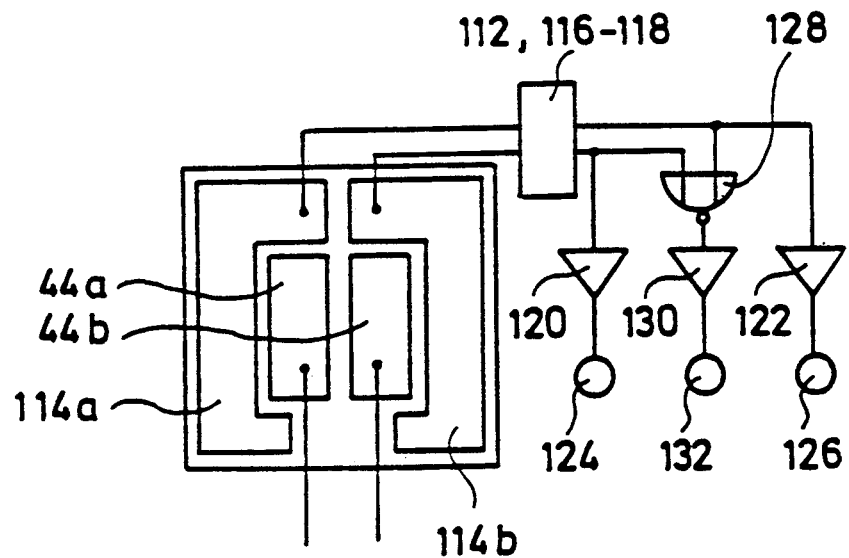

As can be seen in FIG. 6 the auxiliary transducer 114 arrangement comprises two transducer elements 114a and 114b, which are arranged outside of the transducer elements 44a, 44b on the transducer board. The transducer elements 114a and 114b are thus only activated by measuring light if the test area is far removed from the focal plane of the lens 24.

The high-pass arrangement 112, the low-pass arrangement 116 and the rectifier arrangement 110 each comprise two signal channels for processing the signals supplied by the transducer elements 114a and 114b. The output terminals of the low-pass arrangement 116 are directly connected to the power amplifiers 120, 122, which drive luminous diodes 124, 126. When activated the latter indicate that the lens 24 is located at the rear or front end of its range of adjustment, so that a coarse adjustment will have to be conducted by an external servo mechanism or by hand.

The output terminals of the low-pass arrangement 116 are furthermore interconnected by a NOR element 128, which drives a luminous diode 132 via a power amplifier. This indicates by lighting up that the distance between the focal plane of the lens 24 and the just observed point on the surface of the work piece 12 still lies in a range which can be covered by the electro-magnetic servo drive for the lens 24.

In the case of a practical example described above in reference to FIGS. 1 to 4 there was an electrical boosting of the output signal of the optical distance meter 82 inversely proportional to the local reflection conditions of the test area.

Figure 5:
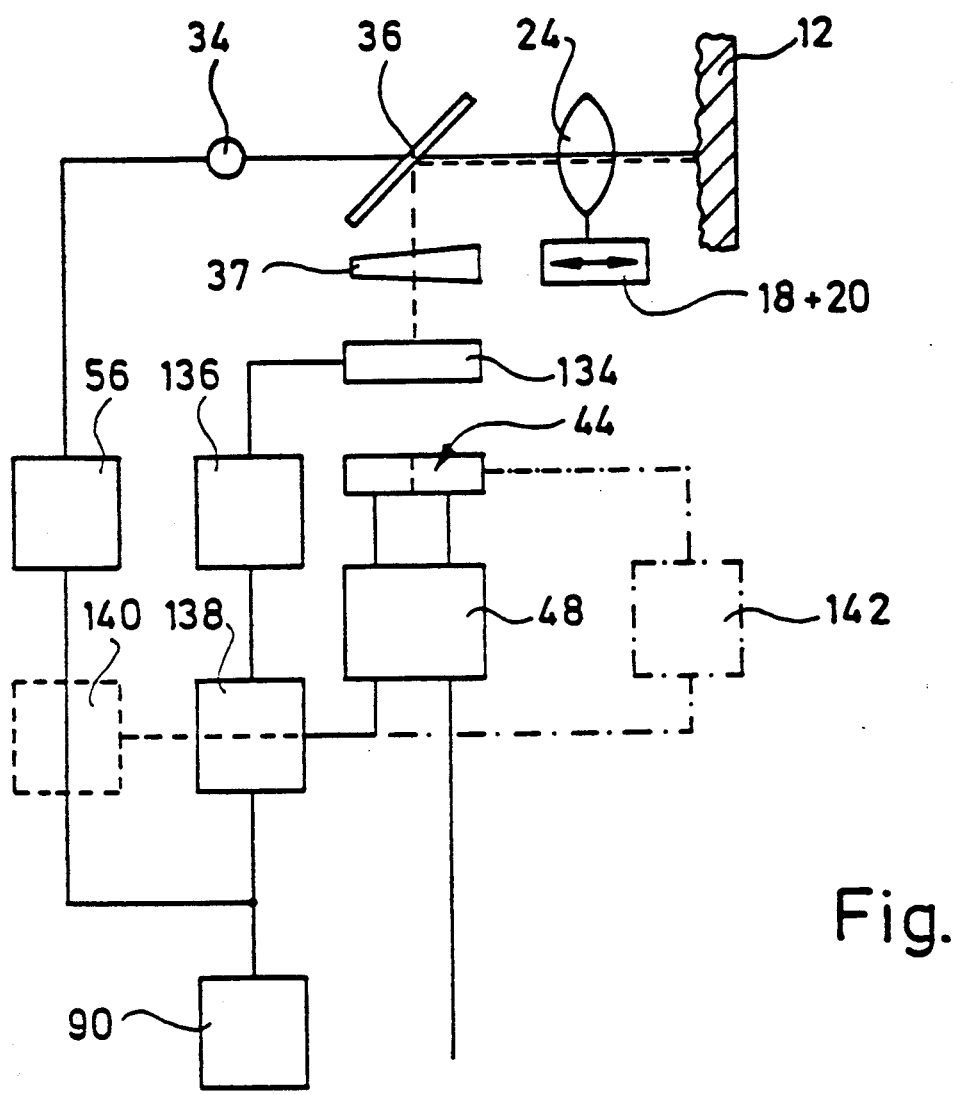

FIG. 5 shows other possibilities of making the slope of the control characteristic independent of the local fluctuations of the reflection conditions of the surface of the work piece. Parts of the measuring instrument, which have already been described above, are again designated by the same reference symbols and need not be fully described in the following.

With a first variant shown in FIG. 5 a closure 134, controller by impulses, is set in the path of the measuring light cast by the measuring mirror onto the transducer arrangement 44. this can be a Pockels cell, for example. The actuation of the electronic closure 134 is effected from the clock generator 90 by means of a power element 136 and a controllable phase shifter 138. The phase control terminal of the phase shifter 138 is pulsed by the output signal of the input circuit 48, which is assigned to the total intensity of the measuring light incident on the transducer arrangement 44. By varying the overlap of the impulses, with which the laser 34 or the closure 134 is driven, it is once more possible for the total quantity of light incident on the transducer arrangement 44 to be independent of the local reflection behaviour of the surface of the work piece.

In a variant shown by a dashed line in FIG. 5 a pulse width modulation circuit 140 is inserted into the junction line between the clock generator 90 and the power amplifier 56. Its control terminal is again pulsed with the output signal of the input circuit 48, again assigned to the total light intensity, the total in such as way that by boosting the mean laser power over the standard case the reduction of local reflection behaviour is compensated for.

Similarly it is possible for a supply voltage source 142 for the transducer arrangement 44 to be pulsed by the output signal of the input circuit 48 assigned to the total light intensity, so that its sensitivity is increased in such a way that the local reduction of reflectivity of the work piece surface is compensated.

Figure 7:
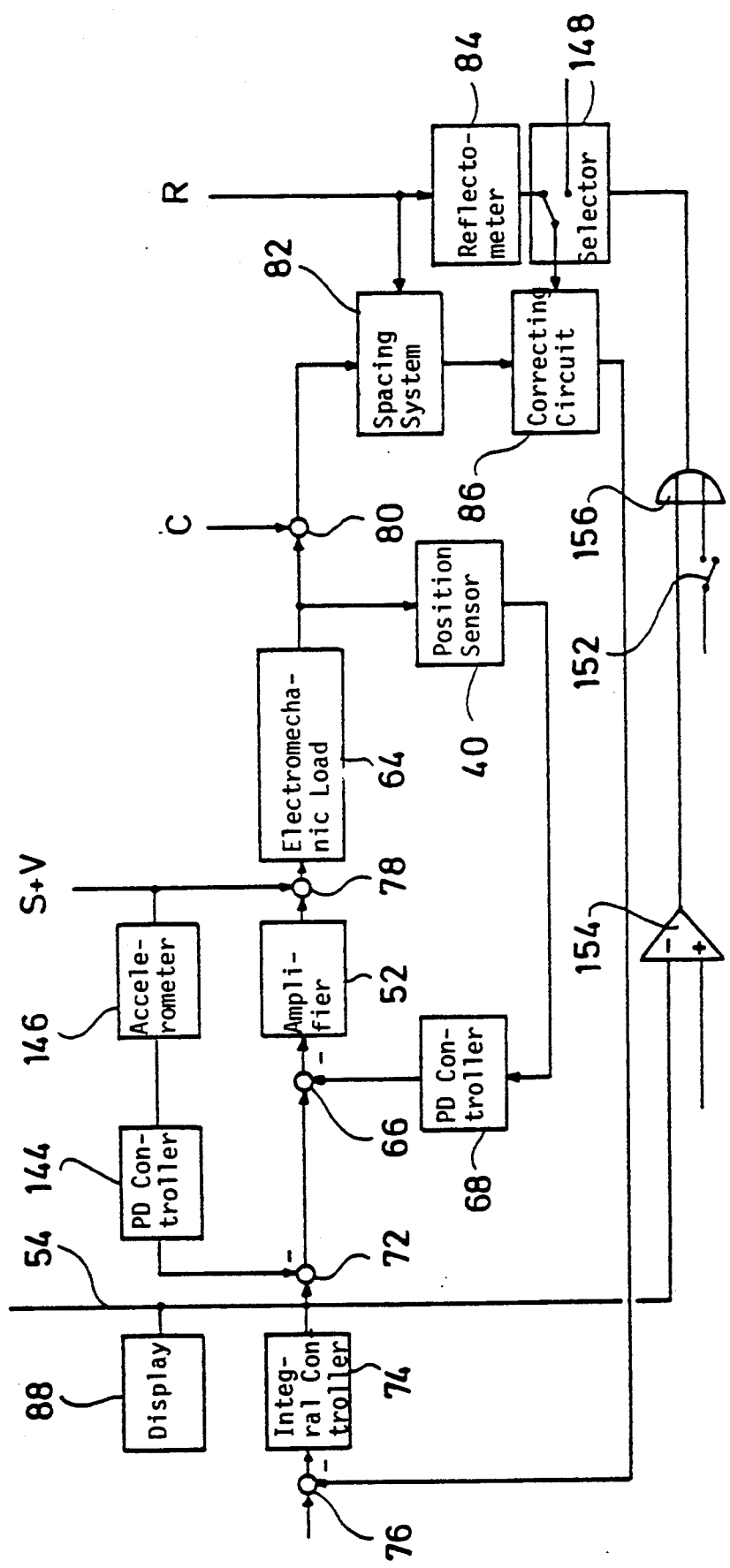

In the modified control circuit in FIG. 7 the circuit elements whose functions correspond with those in FIG. 3, have been given the same references.

The control circuit in FIG. 7 differs from the example already described by the way in which the positive input signal for the subtract circuit 66 is generated: This signal is tapped directly from the output of the subtract circuit 72. Its negative input is connected to the output of a PD controller 144, which in turn is connected to the output of an accelerometer 146. The latter responds to the disturbing mechanical environmental influences.

In practice the accelerometer 146 comprises a second lens and associated flexible mounting, exactly as shown in FIG. 1, and also another position indicator working together with this lens, which can correspond with the position indicator 40 in FIG. 1. The mechanical inertia and oscillatory response of this mass-body lens unit, whose purpose is only to determine the acceleration, are exactly the same as the lens unit used for the optical measurement. It is housed inside the housing 14 of the scanning head 10, in the mechanically equivalent position.

In another modified arrangement the permanent magnet connected to the lens unit, and the coil surrounding this, may be used as the position indicator for the mass-body lens unit, which now works as an induction coil and not as a driving coil.

An accelerometer likewise ensures the control of mechanical disturbances, on account of the above-described conduction of the lens-desired-position signal which is delivered to the positive input of the subtract circuit 66.

In the specific embodiment according to FIG. 7 other provisions have been made for arbitrarily disconnecting the correction of the slope of the control characteristic.

These provisions include a controllable two-way switch 148, which can deliver a normal signal to the control terminal of the correction circuit 86, instead of the output signal of the reflectometer 84, such as would be received with a flat standard test area. The actuation of the two-way switch 148 is accomplished by an OR element 150, either by manual closing of a normally open switch 152 or by the output signal of a difference amplifier 154, which receives the output signal of the integral action controller 74 and compares it with a given switching threshold. This automatically excludes the readjustment of the slope of the control characteristic in respect of the limits of the range of adjustment of the lens 24. The manual closing of the switch 152 is effected if a material-specific alteration of the reflectivity is to be measured across the work piece surface where the latter is known to have no unevenesses. Alterations of this kind could for example occur by way of doping profiles.

Figure 8:
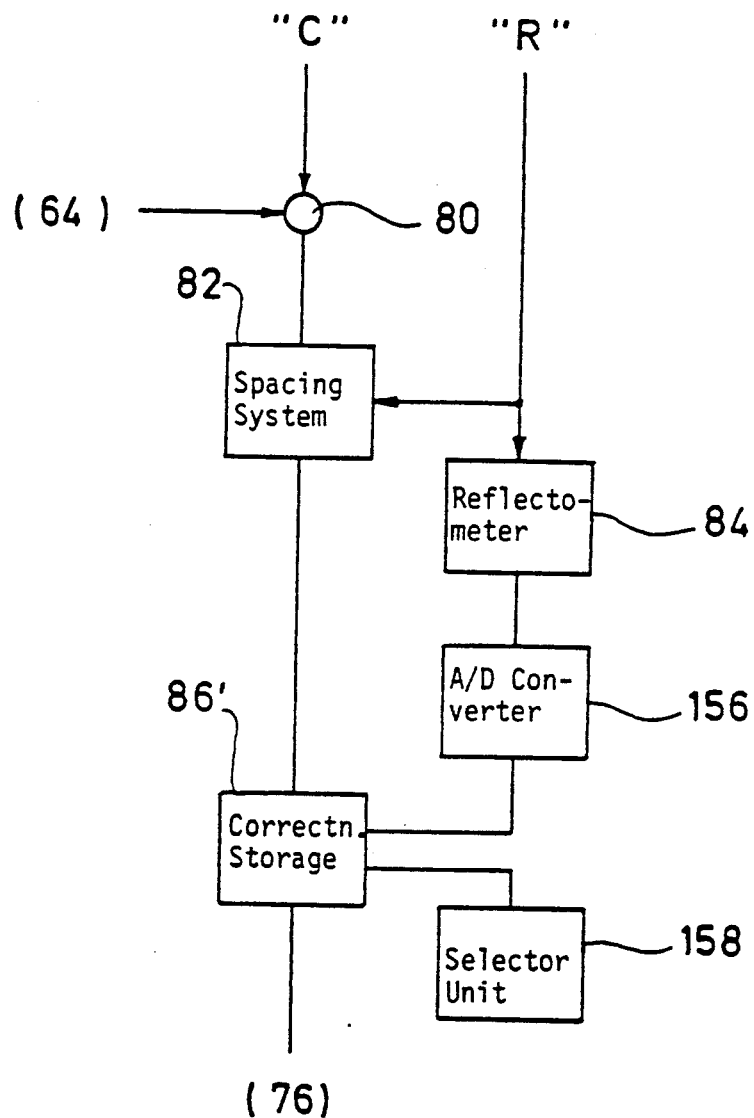

In the further modified practical example according to FIG. 8 the reflectometer 84 is connected to an analogue-to-digital converter 156. Its output signal represents the lower address bit for a correction store 86', in which are filed a number of correction characteristics. Of these, one is selected by the higher address bits, which have been specified by inputting on a selector unit 158. This makes it possible to take into account different measuring conditions, e.g. other basic materials of the work piece which is to be measured, some other measuring optics, another laser etc., and also to compensate for non-linearities of the distance meter 82.

Figure 9:
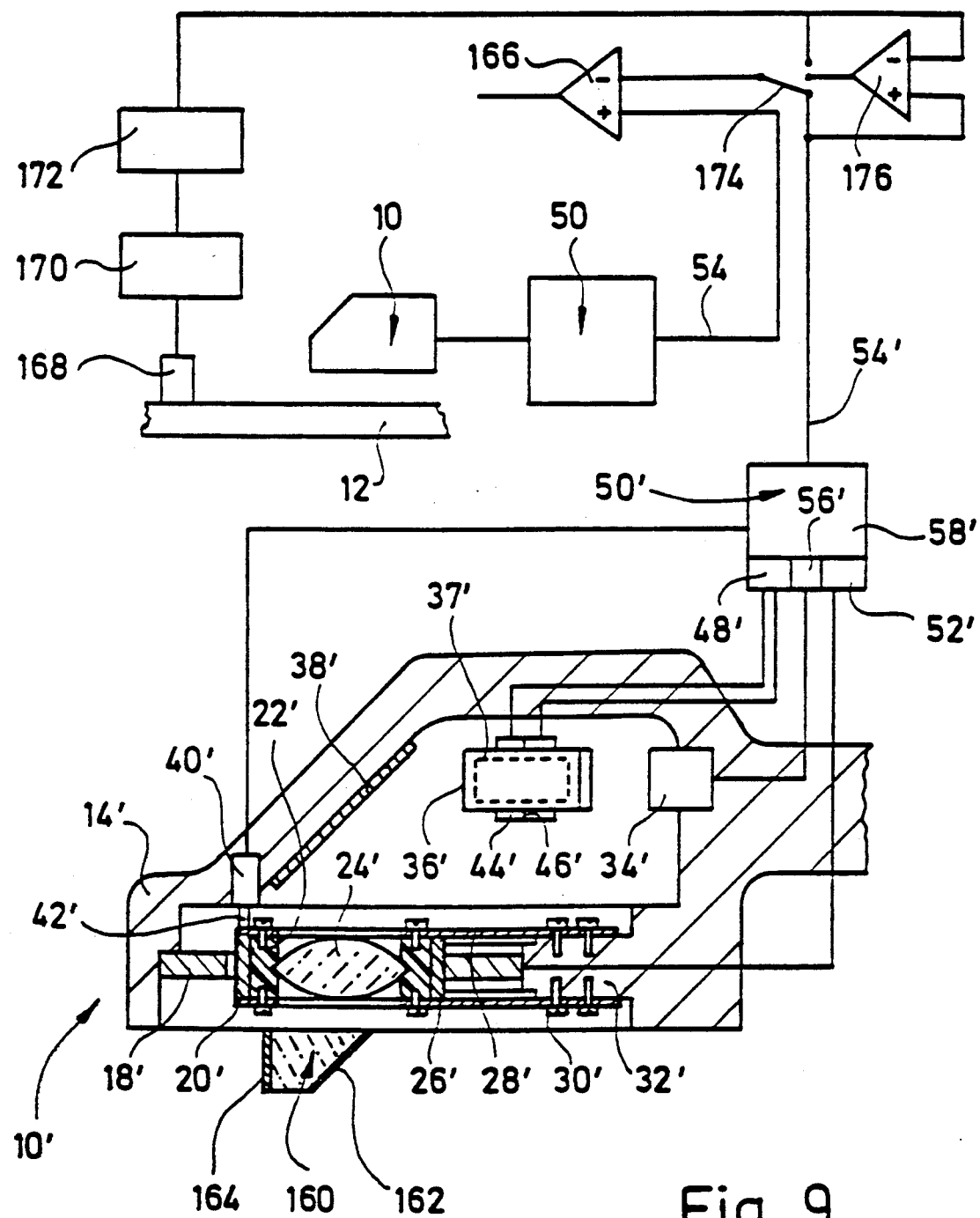

FIG. 9 represents another means of eliminating the influences of vibrations and shocks on the result of measurement. Here a reference scanning head is designated with 10', which, save for the small differences described hereunder, has an exactly identical design as the measuring scanning head 10, which has been fully described in connection with FIG. 1. The corresponding parts of the reference scanning head are designated with the same references, but have an apostrophe added to distinguish them.

Below the lens 24' is installed a glass prism 160, whose front face shown on the right in FIG. 9 slopes at 45 degrees and carries a first mirror 162. In a similar way a mirror 164 is provided on the front face shown on the left in FIG. 9, which runs parallel with the axis of the lens 24'. The glass prism 160 is completely, or possibly detachably, fixed to the housing 14', and the housing 14' is fixed to the housing 14 of the measuring scanning head 10, which is shown in FIG. 9 as a logically separated scanning head. In practice the two housings 14 and 14' may be formed by a single-piece part, in which parallel-adjacent chambers are provided to receive the two beam paths.

In the case of the reference scanning head 10' the light emitted by the laser 34' travels via the mirror 162 to the mirror 164 and from there it is imaged on the transducer arrangement 44' via the mirror 162, the lens 24' and the mirror 36' and also the prism 37'. If the reference scanning head 10' is not subjected to any vibrations or shocks, the image generated by the laser 34' via the lens 24' and the mirror 164 is always lying exactly on the centre line 46' of the transducer arrangement 44'. Deviations from this rest position can only be caused by vibrations and shocks, on account of the fixed installation of the reference face formed by the mirror 164, which means that the distance between the lens 24' and the mirror 164 no longer corresponds with the focal length of the lens 24'. Under these starting conditions a vibration or shock-specific output signal is obtained on the output line 54' of the electronic unit 50' assigned to the reference scanning head 10'. The measuring scanning head 10 is subjected to exactly the same mechanical influences, so we have similar signal portions even in the signal current on the output line 54 of the electronic unit 50 of the measuring scanning head 10.

To the output lines 54 and 54' are connection the inputs of a difference amplifier 166, which supplies at its output a signal which corresponds with the signal on the output line 54, reduced by its vibration or shock-specific signal portions. This signal is the measuring signal that exactly corresponds with the distance between the measuring scanning head 10 and the surface of the work piece 12.

To the output lines 54 and 54' are connected the inputs of a corresponding with the signal on the output line 54, reduced by its vibration or shock-specific signal portions. This signal is the measuring signal that exactly corresponds with the distance between the measuring scanning head 10 and the surface of the work piece 12.

The above-described control of vibrations and shocks applies to the case of mechanical disturbances acting on the measuring scanning head 10 and equally on the reference scanning head 10'. To eliminate in a similar fashion also such mechanical disturbances which act on the work piece 12, an acceleration sensor 168 is fitted to the latter. Its output signal is converted in two integration stages 170, 172 into a position signal, which can be delivered at will onto the negative input of the difference amplifier 166. A two-way switch 174 is provided for switching between this signal and the output signal of the electronic unit 50'.

The two-way switch 174 also has a third working position, in which the negative input of the difference amplifier 166 is connected to the output of another difference amplifier 176. Its input terminals are connected to the outputs of the second integration stage 172, or of the electronic unit 50'. Thus the output signal of the difference amplifier 176 corresponds with the difference in the position signals of the reference scanning head 10' created by the mechanical disturbances, and with the work piece position indicator formed by the circuits 168 to 172.

Thus the arrangement pursuant to FIG. 9 offers a total of three different compensation possibilities, viz: For mechanical disturbances which relate only to the measuring scanning head 10, for mechanical disturbances which relate only to the work piece 12, and for mechanical disturbances which relate both to the measuring scanning head 10 and the work piece 12.

Figure 10:
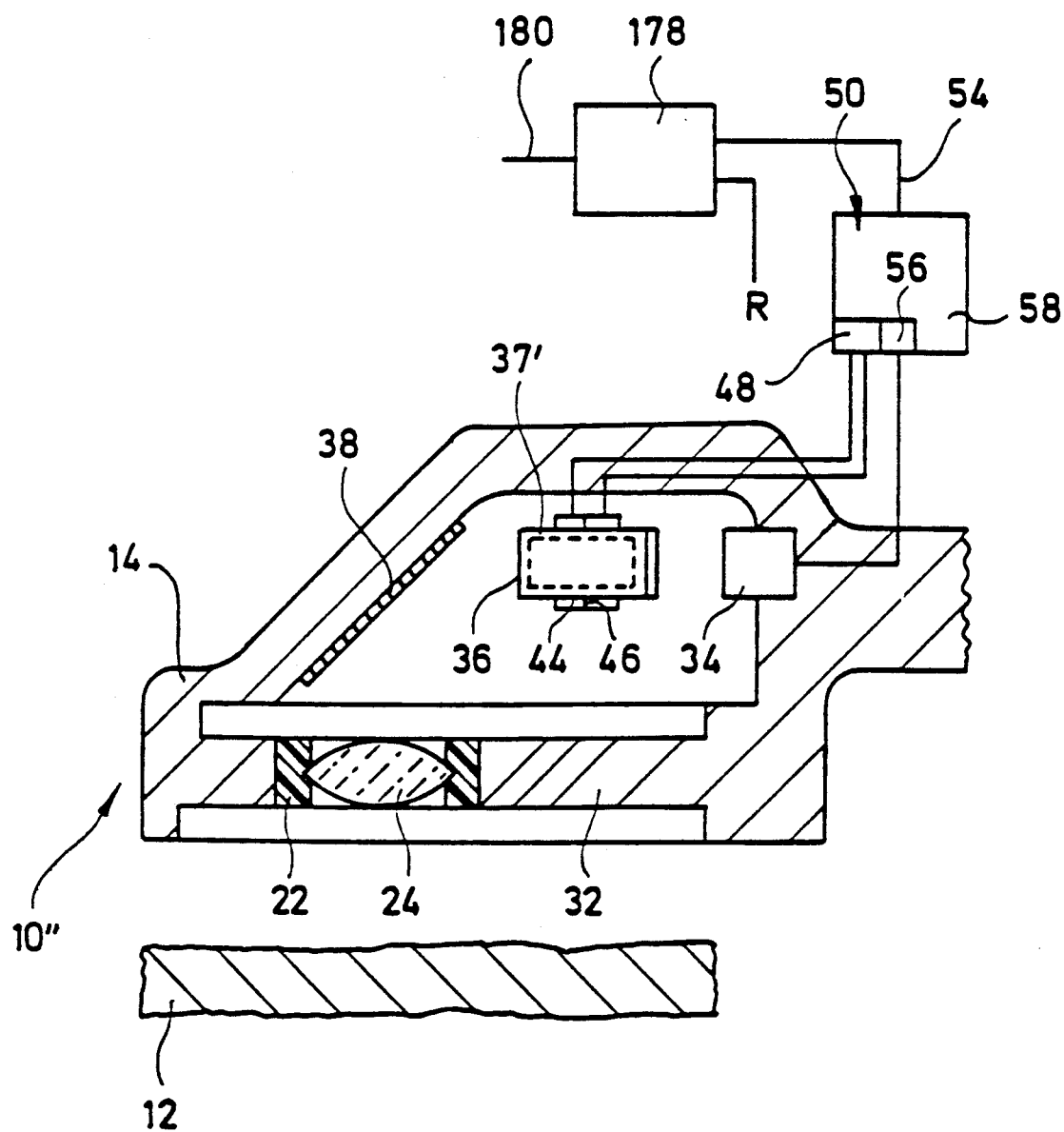

FIG. 10 shows a simplified scanning head 10", which is used as a high-resolution optical proximity switch. Components which have already been described in reference to FIG. 1, are again provided with the same references.

In the case of the scanning head 10" in FIG. 10 the lens mount 22 is installed on the land 32, and the electronic unit 50 monitors only the difference of the output signals of the transducer arrangement 44. For small distances of the focal point of the lens 24 from the surface of the work piece 12 this difference is directly proportional to these distances. If the signal on the output line 54 disappears, this means that the distance between the lens 24 and the work piece 12 is exactly the same as the focal length of the lens 24.

The signal on the output line 54 is delivered to an input of a comparator 178, the other input of which receives a reference signal R. The comparator 178 thus supplies a signal on its output 180 when the distance between the lens 24 and the surface of the work piece 12 is smaller than the focal length of the lens 24.

Thus the total combination of scanning head 10", electronic unit 50 and comparator 178 behaves as a classical proximity switch, but has a considerably better resolution than this.

Figure 11:
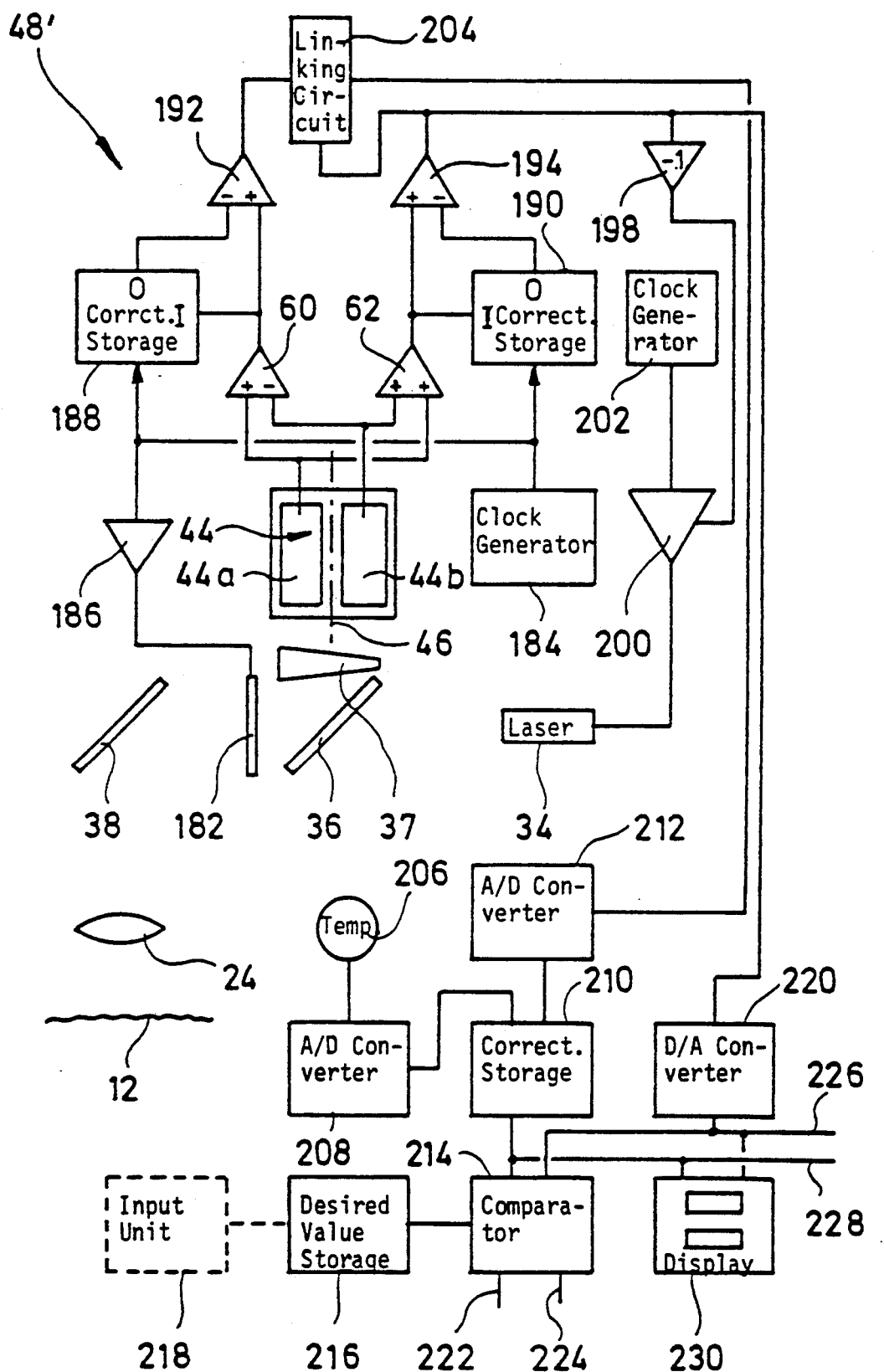

In the bottom of FIG. 11 is again shown schematically the beam path in a scanning head, as has been described above. As variously described, the transducer elements 44a and 44b delivers exactly the same output signal if the distance between the lens 24 and the surface of the work piece 12 corresponds exactly with the focal length of the lens 24. Due to age or thermal influences it is possible that even with this beam configuration there is an asymmetry in the output signals of the transducer elements 44a and 44b. Therefore, in the top part of FIG. 11 is illustrated a device which makes possible an automatic correction of such transducer errors.

Between the deflecting reflector 36 and the deflecting reflector 38 is arranged an electrically controllable mirror 182, which in practice may comprise an LCD unit. The controllable mirror 182 is normally set for passage and at regular intervals it is controlled by a clock generator 184 into the locked position reflecting all the light incident upon it. For this purpose the output signal of the clock generator 184 is delivered by a suitable amplifer 186 to the control electrode of the mirror 182.

The clock generator 184 also drives two correction stores 188, 190 for the purpose of reading a new value at their input terminals I. These terminals are connected to the output of the difference amplifier 60, or the summation amplifier 62.

If the mirror 182 blocks, an exact metric illumination of the transducer 44 is obtained, just as in those cases in which the distance between the lens 24 and the surface of the work piece 12 is exactly the same as the focal length of the lens 24. If under these conditions different output signals of the transducer elements 44a and 44b are obtained, these are then red into the correction store 188. The output signal of the summation amplifier 62, which is a measure for the power of the laser 34 and the sensitivity of the transducer arrangement 44, is read into the correction store 190 at the same time.

When the clock generator 184 ends its output signal, the light returns back to the surface of the work piece 12. The output signal of the difference amplifier 60 assigned to the distance between the focal point of the lens 24 and the surface of the work piece 12 is then united in another difference amplifier 192 with the correction signal previously read into the correction store 188, and the signal obtained at the output of the difference amplifier 192 is thereby independent of age or temperature specific asymmetry in the output signals of the transducer arrangement 44.

In a similar way the output signal of the summation amplifier 62 assigned to the total intensity of the returned light is united in another difference amplifier 194 with the signal which had been received in the calibration phase determined by the clock generator 184. Thus the output signal of the difference amplifier 194 likewise represents a signal which is freed of temperature and age-specific influences of the transducer arrangement 44.

To create an equalisation for the different reflection behaviour of various objects the output signal of the difference amplifier 194 is delivered by an inverter 198 to the control terminal of a controllable amplifier 200. Its input terminal is connected to the output of a clock generator 202, which predetermines the working frequency and the scanning ratio of the laser 34. The output terminal of the amplifier 200 is connected to the laser 34. It is evident that in this way the power of the laser 34 is increased according to the deterioration of the reflection behaviour of the object surface.

Alternative to the above-mentioned solution, the laser 34 may be operated with full rated capacity in a similar fashion as described above in reference to FIG. 5, and place in the beam path between laser 34 and lens 14 an electronically controllable optical attenuator, which is then driven directly by the output signal of the difference amplifier 194. With this solution the measuring light intensity is reduced in respect of good reflecting object surfaces.

If the distance measuring signal and the reflection behaviour measuring signal are chained, e.g. multiplicatively, then the resulting signal shows ever greater changes at stages of the surfaces to be measured, as described above. For this purpose there may be provided once again an appropriate linking circuit 204. Its two inputs are connected to the outputs of the difference amplifiers 192, 194.

The bottom right section of FIG. 11 shows another device for compensating temperature-specific measuring errors. This can, if desired, replace the above-described first correction device, which comprises the components 182-196; 188 and 190. It may however be provided in additional to this first mentioned correction device and then serves for compensating such errors which are caused by parts located behind the controllable mirror 182 during thermal changes.

A thermal sensor 206 is thermally coupled to the housing 14, normally made of metal. Its output signal is delivered to an analogue-to-digital converter 208, whose output signal forms the first part of the total address for addressing the storage cells of a correction store 210.

The second part address is supplied by the output of another analogue-to-digital converter 212, which is loaded on the input side with the distance measuring signal possibly modified in the linking circuit 204.

In the correction store 210 are filed the correct measuring signals assigned to the rough distance measuring signals in respect of different temperatures. These signals are also delivered to a first input of a digital, computing comparator 214. The latter works with a setpoint store 216, which is written by means of an input unit 218 shown dashed and contains one or more switching threshold values. These threshold values are stored in the form of percentages referred to the total intensity of the light incident on the transducer arrangement 44. At its second input the comparator 214 receives a digital signal, which is supplied by an analogue-to-digital converter 220 connected to the output of the difference amplifier 194.

For the purposes of the present description it is assumed that the comparator 214 monitors only two switching thresholds "0%" and "30%". Roughly speaking it works in such a way that it supplies on a first output line 222 a signal if the object surface lies in the focal point of the lens 24 or above this, while on a second output line 224 a signal is produced if the output signal of the difference amplifier 192 reaches 30% of the output signal of the difference amplifier 194 from the top or falls short of this percentage. The signals current on the output lines 222 and 224 may for example be used for the purpose of controlling the rate of advance of a drive moving the work piece 12.

In addition the output signals of a correction store 210 and of the analogue-to-digital converter 220 are supplied also on data lines 226, 228 for external data-processing and continuously displayed on a display unit 230.

The above-described practical examples have in common that the error signal received at the output of the difference amplifier 60, with which the lens servomotor formed by the toroidal coil 18 and the permanent magnet 20 was controlled, was zero when the illuminated point on the test area coincided exactly with the front focal point of the lens 24. In other words: The total scanning head works by reason of the design of the beam path, the detector and the controller so that the test area is measured point-wise.

For many applications it is however advantageous if the test area can be measured also on the basis of larger-sized test spots.

Figure 12:
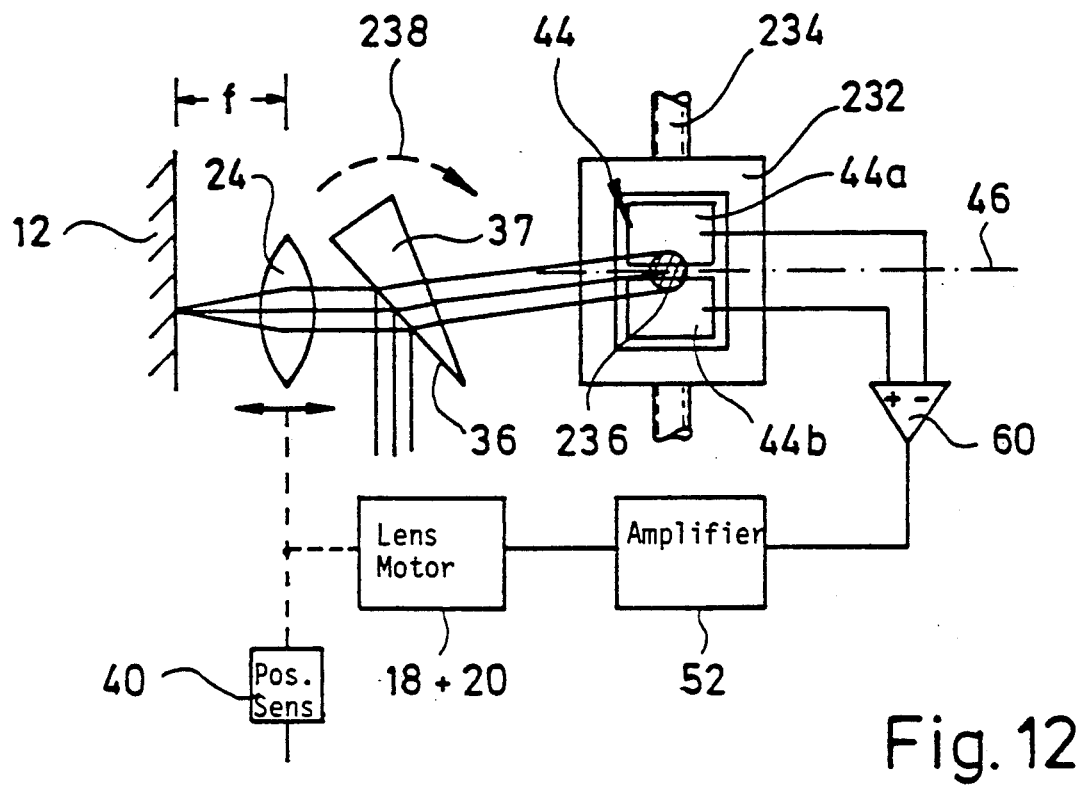

The selective measuring of the test area on the basis of test points or test spots can be realised using a modified scanning head, such as is represented in FIG. 12. Parts of the scanning head, which have already been described above in functionally equivalent form, again have the same references. The main difference of the scanning head in FIG. 12 in relation to the scanning heads that have already been described is that the transducer arrangement 44 is installed on a carriage 232, which is moved by a threaded spindle 234 in the direction which is perpendicular to the beam direction. The main area of the carriage 232 is in fact perpendicular to the drawing plane of FIG. 12, but for the purpose of a clear representation of the beam path it is shown turned into the drawing plane.

FIG. 12 shows a beam path, which is obtained in a similar way to the already described scanning heads having fixed transducer arrangement 44, when the readjustment of the lens position is ended. The distance between the lens 24 and the just measured point on the test area then corresponds exactly to the focal length f of the lens. On the transducer arrangement 44 is obtained a light spot 236 which illuminates in equal parts the transducer elements 44a and 44b. The centre line 46 of the transducer arrangement 44 is offset from the axis of the lens 24, because the prism 37, the bottom face of which also forms the measuring mirror 36, tilts the reflected measuring light beam.

Figure 13:
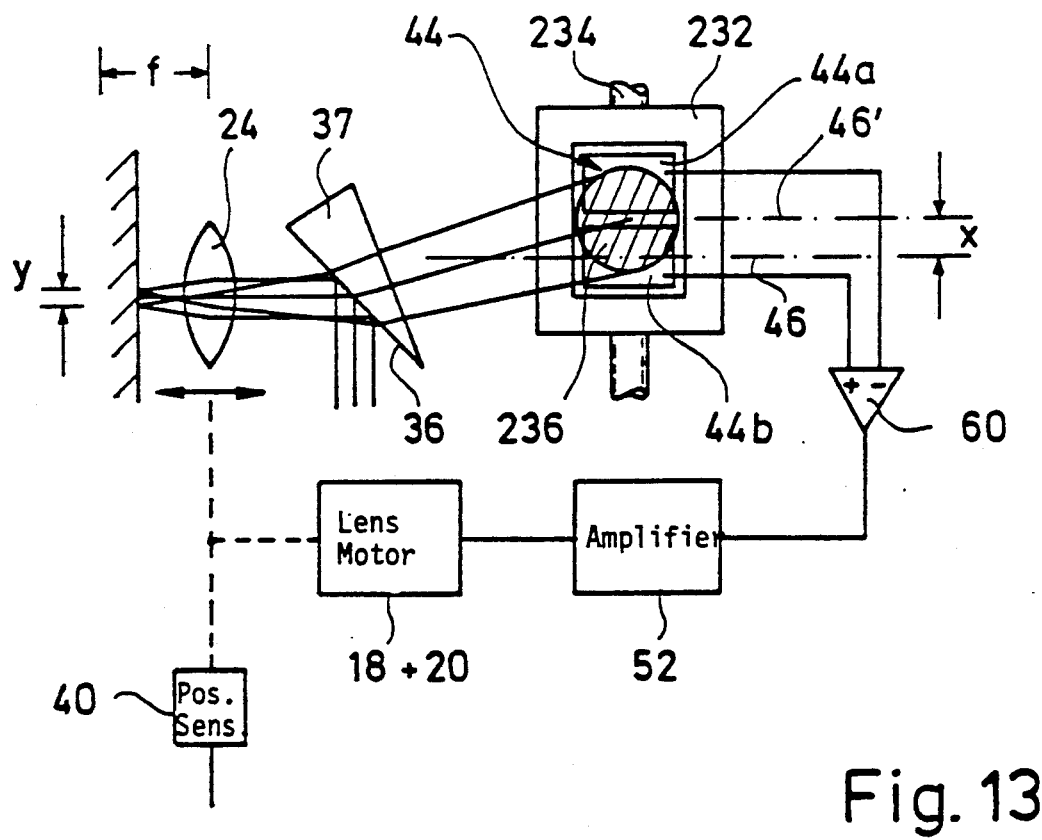

If the carriage 232 is moved upward a small amount x by turning the threaded spindle 234 in FIG. 12, a major part of the light spot 236 will be located on the bottom transducer element 44b. An error signal is then obtained at the output of the difference amplifier 60, and the position of the lens 24 is adjusted until both transducer elements 44a and 44b receive the same light quantity. This condition is represented in FIG. 13. The adjustment of the lens 24 means that the distance between the lens and the surface of the work piece 12 has now become smaller; the frontmost focal point of the lens 24 lies behind the test area, which is now illuminated not in one single point but rather by means of a small disc-shaped spot, the diameter of which is designated by y in FIG. 13. Under such beam conditions the diameter of the light spot 236 widens, but this is of secondary importance, because for measuring the surface profile of the work piece 12 the measure of the asymmetry of the output signals of the transducer elements 44a and 44b is used, and the total light quantity incident on the transducer elements is not altered by the widening of the light spot 236.

By comparing FIG. 12 with FIG. 13 it can easily be seen that the diameter y of the slight spot 236 can be varied by the continuous adjustment of the threaded spindle 234, if desired the surface of the work piece 12 can be measured point-wise, as shown in FIG. 12. If the carriage 232 in FIG. 12 is moved downward, a spot-wise illumination of the work piece surface is again obtained, so that the focal point of the lens 24 is now at a distance in front of the work piece surface.

As a variation of the practical example shown in FIGS. 12 and 13 the lateral displacement of the light spot 236 vis-a-vis the centre line 46 of the transducer arrangement 44 can be accomplished by turning the prism 37 instead of shifting the transducer arrangement, as indicated by an arrow 238 in FIG. 12. It is obvious that the light beam incident on the measuring mirror 36 from the laser must be appropriately tilted so that the light beam reflected from the measuring mirror 36 is again located on the axis of the lens 24.

Figure 14:
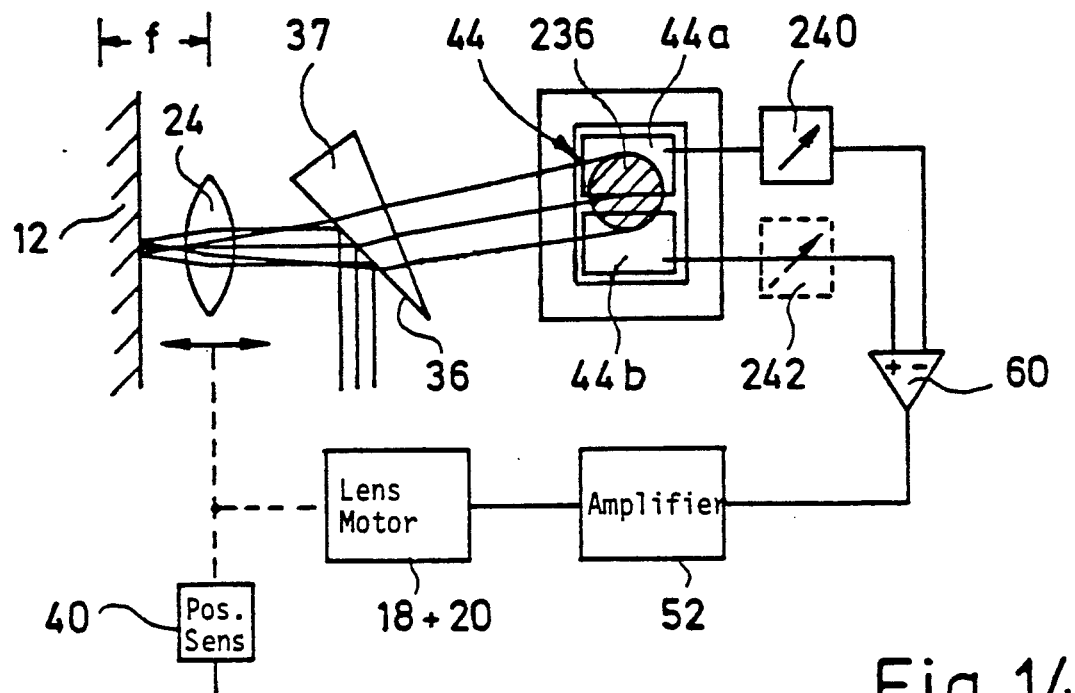

FIG. 14 shows a modified scanning head, in which neither the transducer arrangement 44 nor an optical element of the scanning head has to be moved in order to switch from exact point-wise scanning of the work piece surface to spot-wise scanning of same. According to FIG. 14 an asymmetry is obtained in the detector, the control of which leads to spot-shaped illumination of the work piece surface, by connecting an adjustable attenuator circuit 240 between the output of the transducer element 44a and the associated input terminal of the difference amplifier 60. In the simplest case this may comprise an adjustable resistor. The attenuator circuit 240 delivers at its output a predetermined fraction of the output signal of the transducer element 44a, which for example can be adjusted between 20% and 100%.

So that the output signal of the difference amplifier 60 disappears, it is obvious that the transducer elements 44a and 44b must be illuminated asymmetrically, as shown in FIG. 14. This asymmetric illumination is again however obtained with a beam path, in which the frontmost focal point of the lens 24 is located behind the surface of the work piece 12. This is again scanned spot-wise, so that the size of the spot can be easily adjusted using the attenuator circuit 240.

Alternatively, instead of the attenuator circuit 240 can be inserted an adjustable amplifier circuit 242 between the output of the transducer element 44b and the other input terminal of the difference amplifier 60, which results in conditions that are comparable with those in FIG. 14.

If an attenuator circuit is inserted between the transducer element 44b and the difference amplifier 60, or an amplifier circuit between the transducer element 44a and the difference amplifier 60, then the transducer arrangement 44 must obviously be illuminated asymmetrically exactly in reverse to that shown in FIG. 4, so that an error signal of the dimension of zero is obtained at the output of the difference amplifier 60.

Under these conditions the focal point of the lens 24 is located before the surface of the work piece 12, which again leads to a spot-wise scanning.

A modification of the practical example shown in FIG. 14 resides in that instead of an electrical attenuator circuit there can be used an optical attenuator, which is then only placed before the transducer element 44a or 44b if a spot-wise scanning of the work piece surface is desired.

Instead of multipy attenuator circuits can be used subtract circuits, e.g. in the form of difference amplifiers, which deduct a fixed amount from the output signal of the connected transducer element. Accordingly, adding circuits may be used instead of amplifier circuits, which add a fixed amount to the output signal of the connected transducer element.

Figure 15:
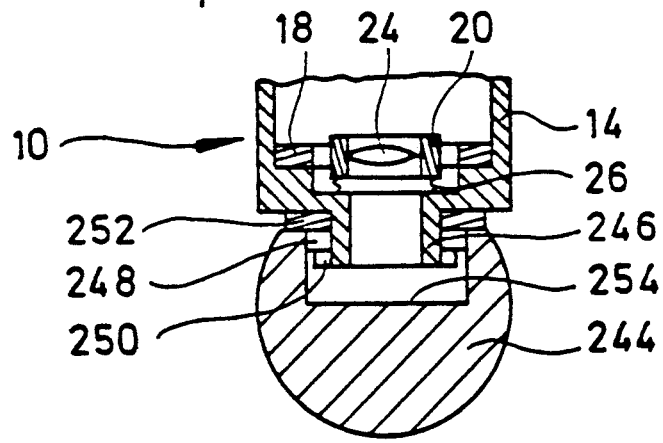

The above-described practical examples of scanning heads may be used for measuring the micro surface contour of the work piece 12, for measuring and testing the surface roughness of the work piece 12 and also as a constituent of coordinate inspection machines. With measuring machines of this kind the actual measuring process must be preceded by an accurate calibration of the starting or zero point. Normally used for this purpose are measuring spheres, whose position is accurately known. By moving the scanning head toward the measuring sphere the absolute coordinates are obtained in respect of a zero point. When using an optical scanning head, such as was described above, only an output signal of the scanning head was obtained when the latter is moved exactly on a radius beam toward the surface of the sphere. In all other cases the light reflected from the surface of the sphere would not reach the lens 24. So as to make possible a tactile calibration of a starting position for such an optical scanning head a calibrating scanning sphere may be installed on a housing connection 246, designated by 244 in FIG. 15, which is provided at the front end of the scanning head 10 below the lens 24.

The test sphere 244 is mounted on the housing connection 246 so that it can be shifted axially, and overlaps with a bayonet flange 248 a bayonet flange 250 at the bottom end of the housing connection 246. The bayonet flanges 248, 250 thus form a stop which limits the downward movement of the test sphere 244.

Between the flattened top side of the test sphere 244 and the bottom side of the housing 10 is inserted an elastic compressible ring 252, which may be comprised of flexible plastic material. The ring 252 normally holds the bayonet flanges 248, 250 together, but allows a movement of the test sphere 244 in FIG. 15 upward against a spring force. Such an upward movement of the test sphere 244 is obtained if the scanning head 10 is moved against a fixed measuring sphere (not shown).

Inside the scanning sphere 244 is provided a reflection area 254, which is exactly perpendicular on the axis of the housing connection 246 and thus is also perpendicular on the axis of the lens 24. The axial position of the reflection area 254 is chosen between the bayonet flanges 248 and 250 in relation to the area of contact so that when the toroidal coil 18 has no current the focal point of the lens 24 is somewhat above the reflection area 254. The compressibility and thickness of the ring 252 is chosen so that the scanning sphere 244 may be moved upward when approaching a rigid obstacle by an amount in relation to the housing 14 that the reflection area 254 lies above the focal point of the lens 24 obtained with a currentless toroidal coil 18. As the scanning head fitted with the scanning sphere is moved toward the measuring sphere it can be seen that the scanning sphere 244 has made frictional contact with the measuring sphere by the fact that the output signal of the scanning head is diverging from the value which is preset by the flexible bias of the ring 252. In addition, the output signal of the scanning head may be used for precision calibration, so that it is not necessary to move the scanning head toward the measuring sphere using the visual checking of an operator, which in the case of scanning heads moved by servo drives requires much tactile sensitiveness and time.

Figure 16:
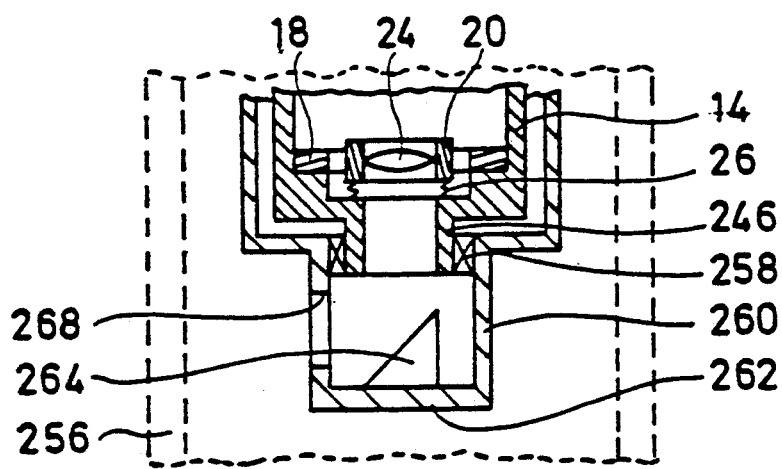

FIG. 16 shows another attachment which is pushed onto the bottom end of a scanning head 10, which makes possible the measurement of the inside surface of a cylinder 256 shown as a dashed line. On the housing connection 246 the bottom end of a sleeve 260 is mounted in an axial-radial bearing 258, which can be set in motion by a drive which is not shown.

A bottom wall 262 of the sleeve 260 carries a reflecting prism 264, which deflects the light emitted by the lens 24 by 90° the deflected light is transmitted through a window 268 of the sleeve 260 onto the inside surface of the cylinder 256, and the measuring light which is reflected from there is again deflected by the reflecting prism onto the axis of the lens 24. In this way the total inside surface of the cylinder 256 may be measured by axially shifting the scanning head 10 bearing the rotating sleeve 260.

I claim:

1. An instrument for exactly determining the distance of a test point located on a test surface from a reference surface and providing a corresponding test signal comprising
   (a) a test light source (34);
   (b) a movably arranged test optical system (24) having a focal plane for imaging the test light source (34) onto the test surface and for returning test light reflected from the test point to a detector site;
   (c) a detector (44, 48), arranged at the detector site, which generates a spacing signal corresponding to the spacing of the test point from the focal plane of the test optical system (24);
   (d) a servo mechanism (18, 20) working on the movably arranged test optical system (24);
   (e) a position sensor (40) associated with the test optical system (24), which supplies a position signal corresponding to the actual position of the test optical system (24); and
   (f) a regulating circuit (58) receiving the spacing signal and the position signal and driving the servo mechanism (18, 20) so as to minimize the spacing signal, whereby the focal plane of the test optical system (24) is set through the test point, and also providing the test signal and including:
      (fa) a first integral controller (74) receiving the spacing signal of the detector (44, 48) and providing a corresponding output signal,
      (fb) a position PD controller (68) receiving the position signal and providing a corresponding output signal, and
      (fc) a first subtracting circuit (66) receiving the output signal of the first integral controller (74) at a first input terminal thereof and the output signal of the position PD controller (68) at a second input terminal thereof and supplying a corresponding error signal controlling the servo mechanism (18, 20).

2. An instrument as set forth in claim 1, wherein
   (g) the regulating circuit further comprises:
      (ga) a second subtracting circuit (72) receiving the output signal of the first integral controller (74) and the position signal supplied by the position sensor (40) and providing a corresponding output signal,
      (gb) a second integral controller (70) receiving the output signal of the second subtracting circuit (72) and providing a modified input signal for the first input terminal of the first subtracting circuit (66).

3. An instrument as set forth in claim 1, wherein the regulating circuit further comprises: a further subtracting circuit (76) receiving a desired position signal for the test optical system (24) and the spacing signal and providing a modified spacing signal fed to the first integral controller (74).

4. An instrument as set forth in claim 1, wherein
(g) the regulating circuit further comprises acceleration compensating means including:
(ga) an acceleration sensor (146) generating an output signal in response to accelerations effective parallel to the adjusting direction of the test optical system (24),
(gb) an acceleration PD controller (144) receiving the output signal of the acceleration sensor (146) and providing a corresponding output signal,
(gc) a further subtracting circuit (72) receiving the output signal of the first integral controller (74) and the output signal of the acceleration PD controller (144) and providing a corresponding output signal, which is fed to the first input terminal of the first subtracting circuit (76).

5. An instrument as set forth in claim 4, in which the test optical system (24) is suspended by a spring arrangement (26, 28) on a housing (14) of a scanning head (10) of the instrument, wherein the acceleration sensor (146) has an inert mass a mass-body optical system (24') identical to the test optical system (24) and the masses moved by the latter, which is installed on the housing (14) of the scanning head (10) by means of a suspension system identical to the suspension system of the test optical system (24) in identical orientation as the latter, and a position sensor (40') is associated with the mass-body optical system (24') which supplies a reference position signal corresponding to the actual position of the mass-body optical system (24').

6. An instrument as set forth in claim 5, in which the servo mechanism for the test optical system (24) is formed by a permanent magnet (20) rigidly fixed with it and a solenoid (18) cooperating with the latter and fixed to the housing (14) of the scanning head (10), wherein the position sensor associated with the mass-body optical system (24') comprises: a second permanent magnet (20') connected to the mass-body optical system (24') which is identical to the permanent magnet (20) connected to the test optical system (24), and an induction coil (18') cooperating with the second permanent magnet (20'), which is identical to the solenoid (18) cooperating with the permanent magnet (20) of the servo mechanism acting on the test optical system (24).

7. An instrument as set forth in claim 1, which includes a reflectometer (84) responsive to the local reflection behaviour of the test surface and providing a corresponding output signal, a spacing signal correcting circuit (86; 100), which on an input side is actuated by the spacing signal and on a control terminal is actuated by the output signal of the reflectometer (84) and provides a corrected spacing signal fed to the first integral controller (74).

8. An instrument as set forth in claim 7, in which the detector (82) supplying the spacing signal comprises two transducer elements (44a, 44b) producing output signals corresponding to the amounts of test light received and arranged on both sides of a centerline (46) of the detector (82) and a differential amplifier (60) actuated by their output signals, wherein the reflectometer (84) is formed by the two transducer elements (44a, 44b) and a summation amplifier (62) actuated by their output signals thus providing an output signal corresponding to the local reflection behaviour of the test surface.

9. An instrument as set forth in claim 7, wherein the correcting circuit comprises a division circuit (100), the dividend input of which receives the spacing signal, the divisor input of which receives the output signal of the reflectometer and an output terminal of which provides the corrected spacing signal, or comprises a controllable amplifier actuated by the spacing signal, an amplification control terminal of which is actuated by the output signal of the reflectometer and an output terminal of which provides the corrected spacing signal.

10. An instrument as set forth in claim 7, wherein the output signal of the reflectometer (84) is digitized (156) and the correcting circuit comprises a correcting storage (86'), which is addressed by the digitized (156) output signal of the reflectometer (84).

11. An instrument as set forth in claim 10, which includes a selector unit (158) associated with the correcting storage (86') for addressing different memory fields, inside of which residual addressing is effected by the digitized output signal of the reflectometer (84).

12. An instrument as set forth in claim 1, which includes a reflectometer (84) providing an output signal corresponding to the local reflection behaviour of the test surface and an optical attenuator (134) driven by the output signal of the reflectometer (84), which is inserted at any point in the beam path between the test light source (34) and the detector (44, 58), or a power control circuit (140) for the test light source (34), a control terminal of which receives the output signal of the reflectometer (84), or a transducer control circuit (142) driven by the output signal of the reflectometer (84) and controlling the sensitivity of a transducer arrangement (44) of the detector (44, 48).

13. An instrument as set forth in claim 7 or 12, wherein a starting circuit (148) is associated with the reflectometer (84) or an instrument part driven by it which suppresses the correction of the spacing signal as regards the local reflection behaviour of the test surface, by request of a user (152) or automatically (154) should the test optical system (24) have deflected far from its central position, as when there is no opposing test surface.

14. An instrument as set forth in claim 7 or 12, which includes a display unit (109) actuated by the output signal of the reflectometer (84).

15. An instrument as set forth in claim 1, wherein transducer elements (44a, 44b) of the detector (44, 48) are surrounded by auxiliary transducer elements (114a, 114b) providing output signals corresponding to the amounts of test light received and these output signals are displayed on a coarse setting display unit (124, 126, 132).

16. An instrument as set forth in claim 1, wherein the light source (34) is a pulsed laser and the spacing signal provided by the detector (44, 48) is fed to a phase-sensitive rectifier arrangement (96), which is driven at the working frequency (90) of the laser (34).

17. An instrument as set forth in claim 1, wherein a display unit (88) is connected to the output of the first integral controller (74).

18. An instrument for exactly determining the distance of a test point located on a test surface from a reference surface and providing a corresponding test signal comprising
(a) a test light source (34);
(b) a movably arranged test optical system (24) having a focal plane for imaging the test light source

(34) onto the test surface and for returning test light reflected from the test point to a detector site;

(c) a detector (44, 48), arranged at the detector site, which generates a spacing signal corresponding to the spacing of the test point from the focal plane of the test optical system (24);

(d) a servo mechanism (18, 20) working on the movably arranged test optical system (24); and (e) a regulating circuit (58) receiving the spacing signal and driving the servo mechanism (18, 20) minimizing the spacing signal, whereby the focal plane of the test optical system (24) is set through the test point, and also providing the test signal; wherein (f) the test optical system (24) is associated with a position sensor (40), which supplies a position signal corresponding to the actual position of the test optical system (24); and (g) acceleration compensating means are provided producing a reference test signal and including;

(ga) a reference light source (34'), (gb) a movably arranged reference optical system (24') having a focal plane for imaging the reference light source (34') onto a reference point located on a fixed reference surface (164) and for returning reference light reflected from the latter to a reference detector site, (gc) a reference detector (44', 48') located at the reference detector site, which generates a reference spacing signal corresponding to the distance of the reference test point from the focal plane of the reference optical system (24'), (gd) a reference servo mechanism (18', 20') working on the movably arranged reference optical system (24'), (ge) a reference position sensor (40') associated with the reference optical system (24') and providing a reference position signal corresponding to the actual position of the reference optical system (24'), and (gf) a reference regulating circuit (52') receiving the reference spacing signal and driving the reference servo mechanism (18', 20') minimizing the reference spacing signal, whereby the focal plane of the reference optical system (24') is set through the reference point, and also providing a reference test signal, wherein (gg) the reference light source (34') and the test light source (34), the test optical system (24) and the reference optical system (24') and instrument parts carrying these optical systems, the servo mechanism (18, 20) and the reference servo mechanism (18', 20') and the regulating circuit (58) and the reference regulating circuit (58') are of identical design and instrument parts carrying the test optical system (24) and the reference optical system (24') are rigidly connected with parallel alignment of the optical axis thereof, and (gh) the test signal and the reference test signal are combined by a difference circuit (166), an output terminal of which thus provides an acceleration compensated test signal.

19. An instrument as set forth in claim 18, wherein a normal of the reference surface (164) intersects the axis of the reference optical system (24'), preferably perpendicularly, and a deflecting mirror (162) is arranged closely adjacent to the reference optical system (24') on its axis.

20. An instrument as set forth in claim 18, which includes a work piece position sensor (168-172) cooperating with a work piece (12) carrying the test surface and providing a corresponding work piece position signal and a selecting switch (174), first and second input terminals of which receive the work piece position signal and the reference test signal, respectively, and an output terminal of which is connected to the reference test signal input terminal of the difference circuit (166).

21. An instrument as set forth in claim 20, wherein the selected switch (174) has a third input terminal connected to an output terminal of a second difference circuit (176), input terminals of which receive the reference test signal and the work piece position signal.

22. An instrument as set forth in claim 1, in which the detector (44, 48) comprises two transducer elements (44a, 44b) arranged on both sides of a centerline (46) and providing output signals corresponding to the amounts of light received, respectively, wherein output signals of a summation amplifier (62) and of a difference amplifier (60), both of which are actuated by the output signals of the two transducer elements (44a, 44b), are delivered to a linking circuit (63; 204), which generates from these signals by multiplication or in a non-linear fashion a test signal depending on both the surface contour and the local reflection behaviour of the test surface.

23. An instrument as set forth in claim 1, which includes a mirror (182) movable between an active position, wherein the mirror perpendicularly extends into a portion of the beam path, in which the test light represents a parallel beam, and a non-active position out of the beam path, a signal storage (188, 190), in which the output signal of the detector (44, 48) obtained in the active position of the mirror (182) is stored as a correction signal, and a difference circuit (192, 194), which deducts the correction signal obtained in the active position of the mirror (182) from the spacing signal obtained from the detector (44, 48) in the non-active position of the mirror (182).

24. An instrument as set forth in claim 1, which includes a comparator (178) which continuously compares the test signal (54) with a reference value (R) and if both signals agree delivers an output signal.

25. An instrument as set forth in claim 1, which includes a temperature sensor (206) thermally coupled to a housing (14) of a scanning head (10) of the instrument and providing an output signal corresponding to the temperature of the housing (14) and a correction circuit (210) for correcting the test signal as a function of the output signal of the temperature sensor (206).

26. An instrument as set forth in claim 25, wherein the correction circuit comprises a correction memory (210), address terminals of which are actuated by a digitizing circuit (208) receiving the output signal of the temperature sensor (206) and by a digitizing circuit (212) receiving the test signal.

27. An instrument as set forth in claim 1, which includes mechanical (232, 234), optical (37, 238) or electrical (240, 242) signal modifying means which modify the output signal of the detector (44, 48) so that if the test point is in an off-focal position a spacing signal is obtained that would be obtained for a focal point position of the test point under normal working conditions.

28. An instrument as set forth in claim 27, wherein said signal modifying means comprise means (232, 234) for moving a transducer arrangement (44) belonging to the detector (44, 48) and including transducer elements (44a, 44b) being symmetric with respect to a centerline (46) of the transducer arrangement (44) in a direction perpendicular to the beam axis.

29. An instrument as set forth in claim 27, wherein said signal modifying means comprise means (37, 238) for lateral offsetting of the test light reflected from the test surface and impinging on a transducer arrangement (44) of the detector (44, 48) including transducer elements (44a, 44b) being symmetric with respect to a centerline (46) of the transducer arrangement.

30. An instrument as set forth in claim 29, wherein the means for lateral offsetting of the reflected test light beam comprise a swiveling prism (37) or a prism which is additionally inserted into the beam path.

31. An instrument as set forth in claim 27, the detector (44, 48) of which comprises a transducer arrangement (44) including transducer elements (44a, 44b) being symmetric with respect to a centerline (46) of the transducer arrangement (44), wherein the signal modifying means comprise an optical attenuator arranged before one of the transducer elements (44a, 44b), preferably movable at will in and out of the beam path.

32. An instrument as set forth in claim 17, the detector (44, 48) of which comprises a transducer arrangement (44) including transducer elements (44a, 44b) being symmetric with respect to a centerline (46) of the transducer arrangement (44) and providing output signals corresponding to the amounts of test light received, respectively, wherein the signal modifying means comprise an electrical signal changing circuit (240, 242) receiving the output signal of one of the transducer elements (44a, 44b), the degree of signal change being preferably adjustable and the range of adjustment preferably including the the alteration factor "1".

33. An instrument set forth in claim 1 or 18, wherein a probe (244) is mounted on a housing (14) of a scanning head (10) of the instrument in front of the test optical system (24), which comprises an internal reflection area (254) which is perpendicular to the beam axis.

34. An instrument as set forth in claim 33, wherein the exterior surface of the probe (244) is spherical and the internal reflection area (254) is preferably set through the center point of this spherical surface.

35. An instrument as set forth in claim 33, wherein the probe (244) is arranged on the housing (14) for movement parallel to the beam axis and is biased by a spring (252) in such a position, in which the internal reflection area (254) is located beyond the focal point of the test optical system (24) with a non-excited servomechanism (18, 20).

36. An instrument as set forth in claim 1 or 18, which includes a deflecting mirror (264) rotatable through 90 degrees about the beam axis and arranged in front of the test optical system (24).

* * * * *